Jan. 16, 1962 W. C. TROST 3,017,211

MECHANISM FOR TYING WEAVERS' KNOTS

Original Filed July 1, 1957 8 Sheets-Sheet 1

INVENTOR.
WAYNE C. TROST
BY
Wolfe, Hubbard, Voit & Osann
ATTORNEYS

MECHANISM FOR TYING WEAVERS' KNOTS

Original Filed July 1, 1957 8 Sheets-Sheet 2

INVENTOR.
WAYNE C. TROST
BY
Wolfe, Hubbard, Voit & Osann
ATTORNEYS

MECHANISM FOR TYING WEAVERS' KNOTS

Original Filed July 1, 1957 8 Sheets-Sheet 3

INVENTOR
WAYNE C. TROST
BY
Wolfe, Hubbard, Voit & Osann
ATTORNEYS

MECHANISM FOR TYING WEAVERS' KNOTS

Original Filed July 1, 1957 8 Sheets-Sheet 4

INVENTOR.
WAYNE C. TROST
BY
Wolfe, Hubbard, Voit & Osann
ATTORNEYS

Jan. 16, 1962 W. C. TROST 3,017,211

MECHANISM FOR TYING WEAVERS' KNOTS

Original Filed July 1, 1957 8 Sheets-Sheet 5

INVENTOR.

WAYNE C. TROST

BY

Wolfe, Hubbard, Voit & Osann

ATTORNEYS

Jan. 16, 1962 W. C. TROST 3,017,211

MECHANISM FOR TYING WEAVERS' KNOTS

Original Filed July 1, 1957 8 Sheets-Sheet 6

INVENTOR.

WAYNE C. TROST

BY

Wolfe, Hubbard, Voit & Osann

ATTORNEYS

INVENTOR.
WAYNE C. TROST
BY
Wolf, Hubbard, Voit & Osann
ATTORNEYS

Jan. 16, 1962 W. C. TROST 3,017,211

MECHANISM FOR TYING WEAVERS' KNOTS

Original Filed July 1, 1957 8 Sheets-Sheet 8

INVENTOR.
WAYNE C. TROST
BY
Wolfe, Hubbard, Voit & Osann
ATTORNEYS

United States Patent Office 3,017,211 Patented Jan. 16, 1962

3,017,211
MECHANISM FOR TYING WEAVERS' KNOTS

Wayne C. Trost, % Barber-Colman Co., 1300 Rock St., Rockford, Ill.

Original application July 1, 1957, Ser. No. 669,234. Divided and this application Oct. 22, 1959, Ser. No. 838,669
9 Claims. (Cl. 289—3)

The subject matter of this application is disclosed in my copending application Serial No. 669,234, filed July 1, 1957, now abandoned, of which the present application is a division.

The general object of this invention is to provide a new and improved mechanism which, as compared to prior weavers' knotters, is simpler in construction, more durable in operation, and will operate at higher speeds.

Another object is to adapt such a knotter for instantaneous operation in uniting two threads one of which may be traveling at high speed.

The invention also resides in the novel manner of forming and interlocking the loops of the knot by devices having short and mostly unidirectional motions.

Other objects and advantages of the invention will become apparent from the following detailed description taken in connection with the accompanying drawings, in which—

Figures 1, 2, 3:
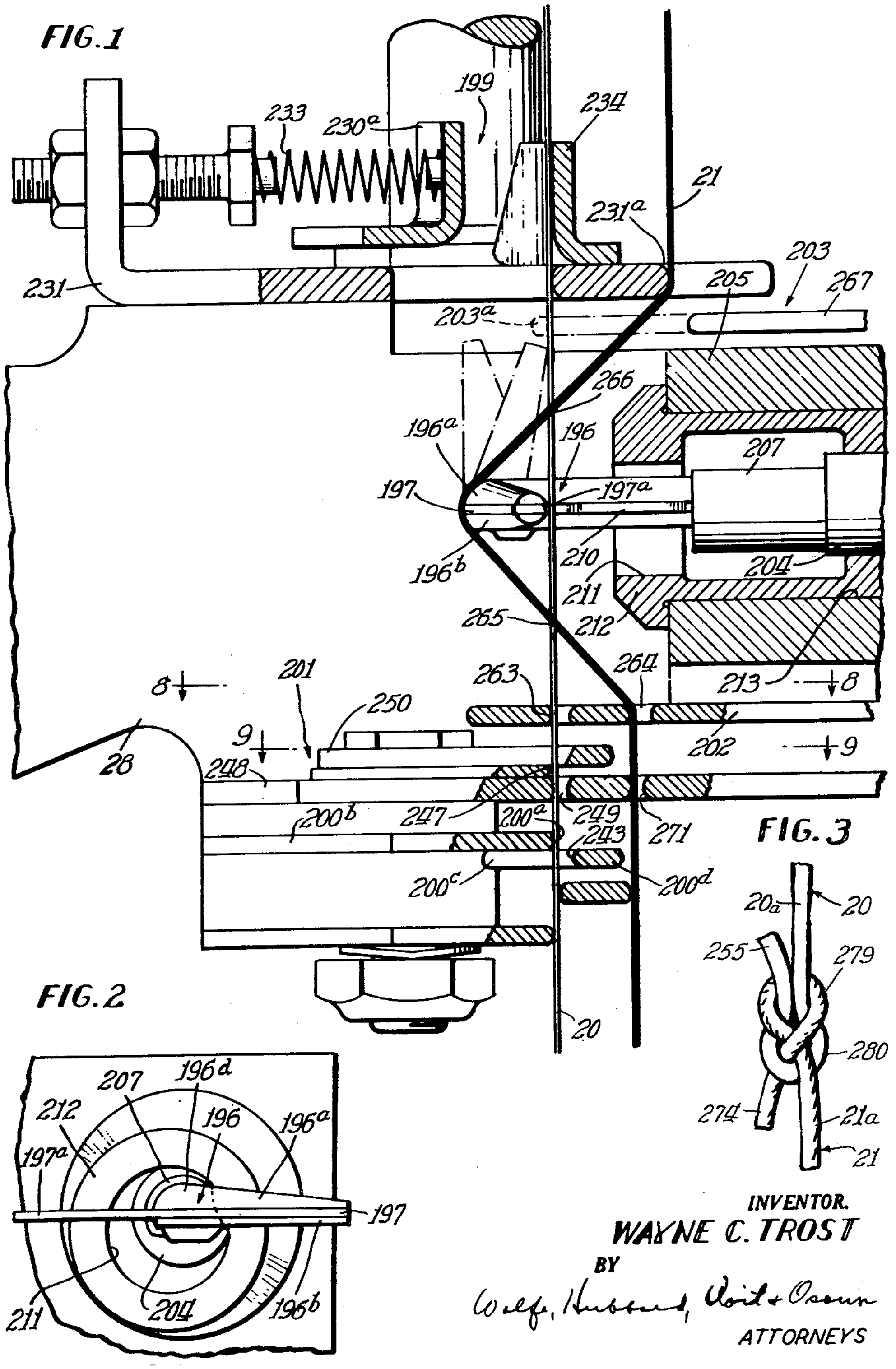
FIGURE 1 is a fragmentary elevational view of the improved knotter with certain parts broken away and shown in section.
FIG. 2 is a fragmentary end view of the knotter bill and its actuating cam.
FIG. 3 is a plan view of a weaver's knot.
Figures 8, 9:
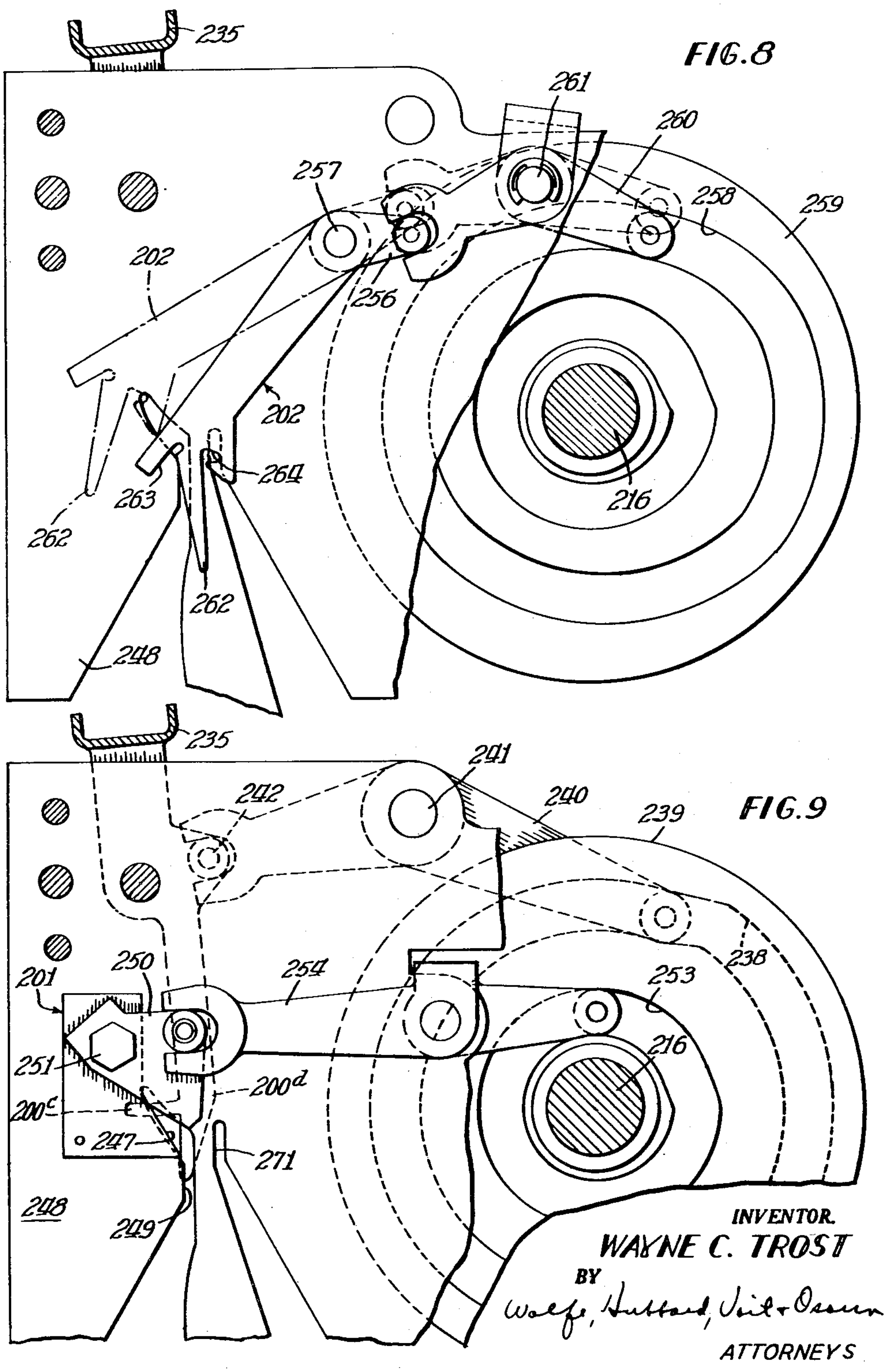

FIGS. 8 and 9 are fragmentary sectional views taken respectively along the lines 8—8 and 9—9 of FIG. 1.

FIGS. 10–15 are fragmentary perspective views showing different steps in the formation of a weaver's knot.

Figures 6, 7:
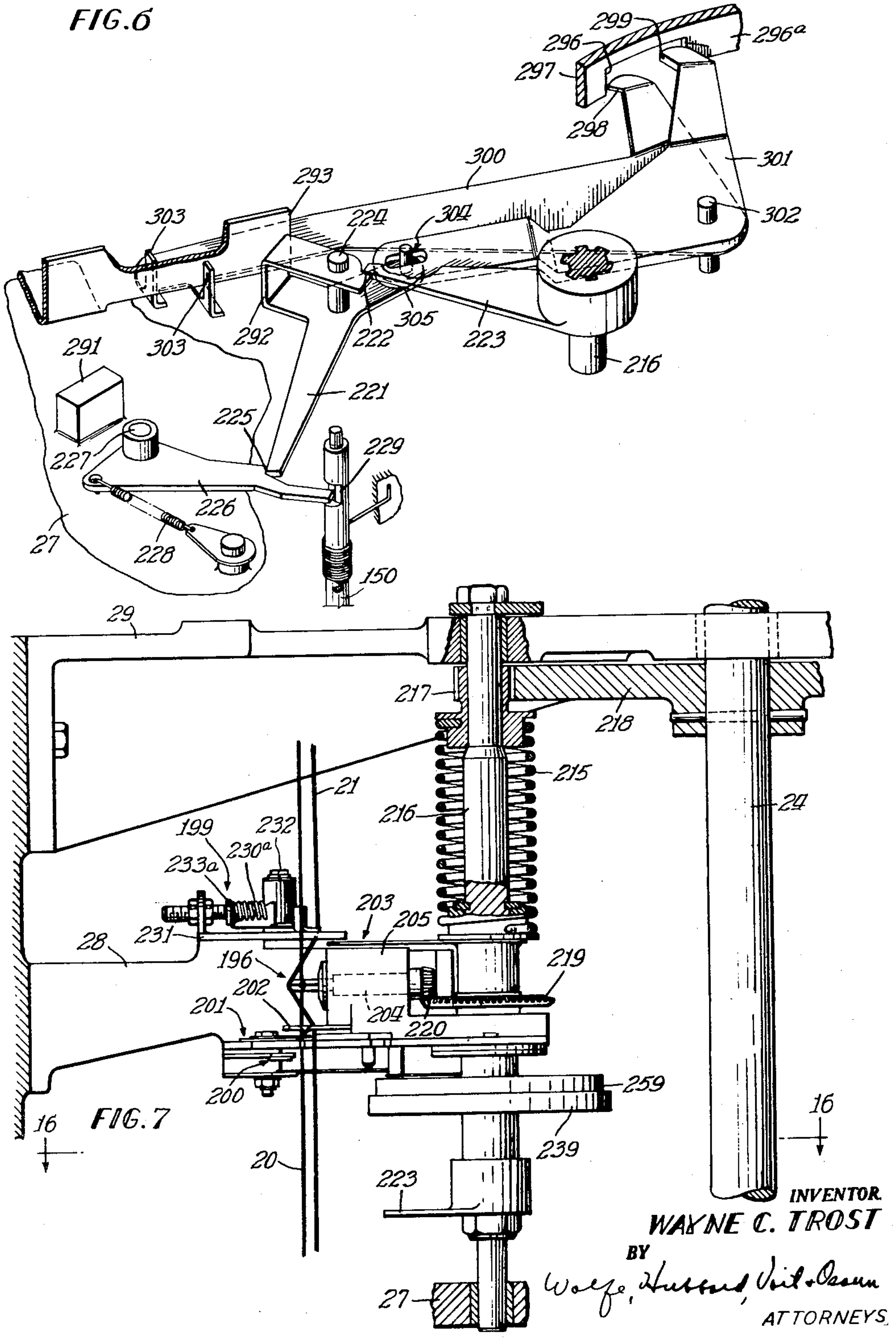
FIG. 6 is a fragmentary perspective view of the knotter firing mechanism.
FIG. 7 is a fragmentary side view of the knotter with part of its actuator broken away.
Figure 16:
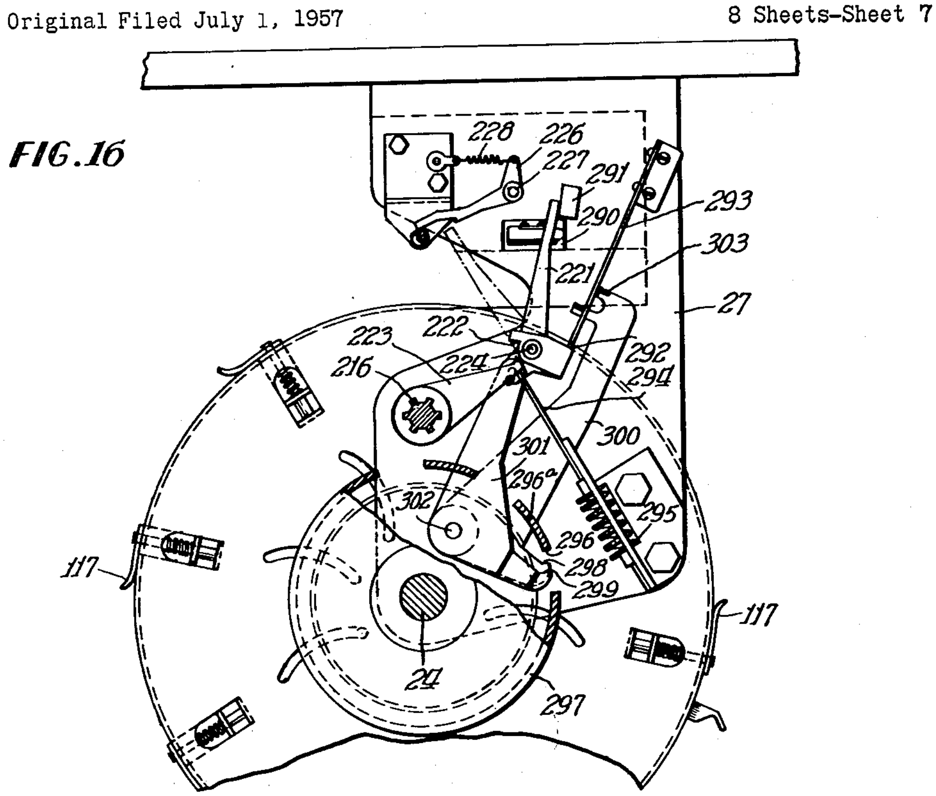

FIG. 16 is a fragmentary sectional view taken along the line 16—16 of FIG. 7.

Figure 17:
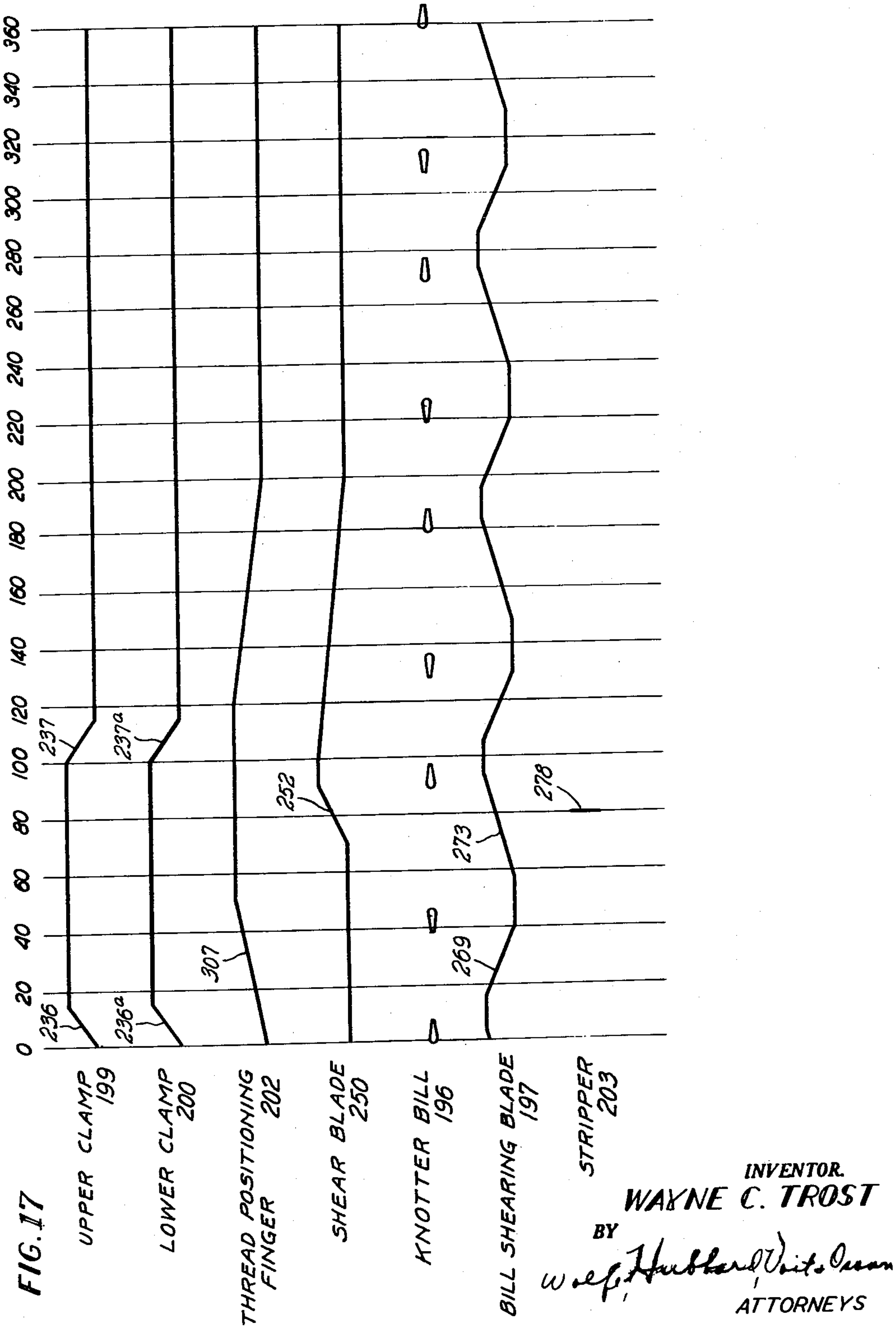

FIG. 17 is a time chart of the knotter cycle.

For purposes of illustration, the invention is shown in the drawings incorporated in a knotter for manipulating a first thread 20 running at high speed and a second or reserve thread 21 lying alongside the first thread to form a so-called weaver's knot 23 (FIGS. 3 and 15) uniting the two threads. In such a knot, a loop 280 in the first thread is interlocked with a loop 279 in the second thread with the free leg 255 of the first thread extending over the free leg 274 of the second thread and then through the loop 279. The other or uncut leg 21$^a$ of the thread 21 lies on top of the loop 280 and passes beneath the leg 274 and around the free leg 255 and the uncut leg 20$^a$ of the thread 20. As a result, the loops 279 and 280 are locked together in the desired manner characteristic of a weaver's knot.

In accordance with the present invention, the knot 23 is formed instantaneously or in about .005 to .015 of a second during a revolution of a bill 196 which forms the two loops 279, 280 in interlocking relation while coacting with a cam actuated shearing bill 197, upper and lower clamps 199 and 200 for stopping and holding the running thread 20 during tying of the knot, a shear 201 for cutting off the thread 20 adjacent the knot after the latter is tied, a finger 202 for shifting the positions of the threads in the course of the tying, and a stripper 203 which removes the completed knot from the bills.

*Knotter bills*

Figures 10, 11, 12, 13:
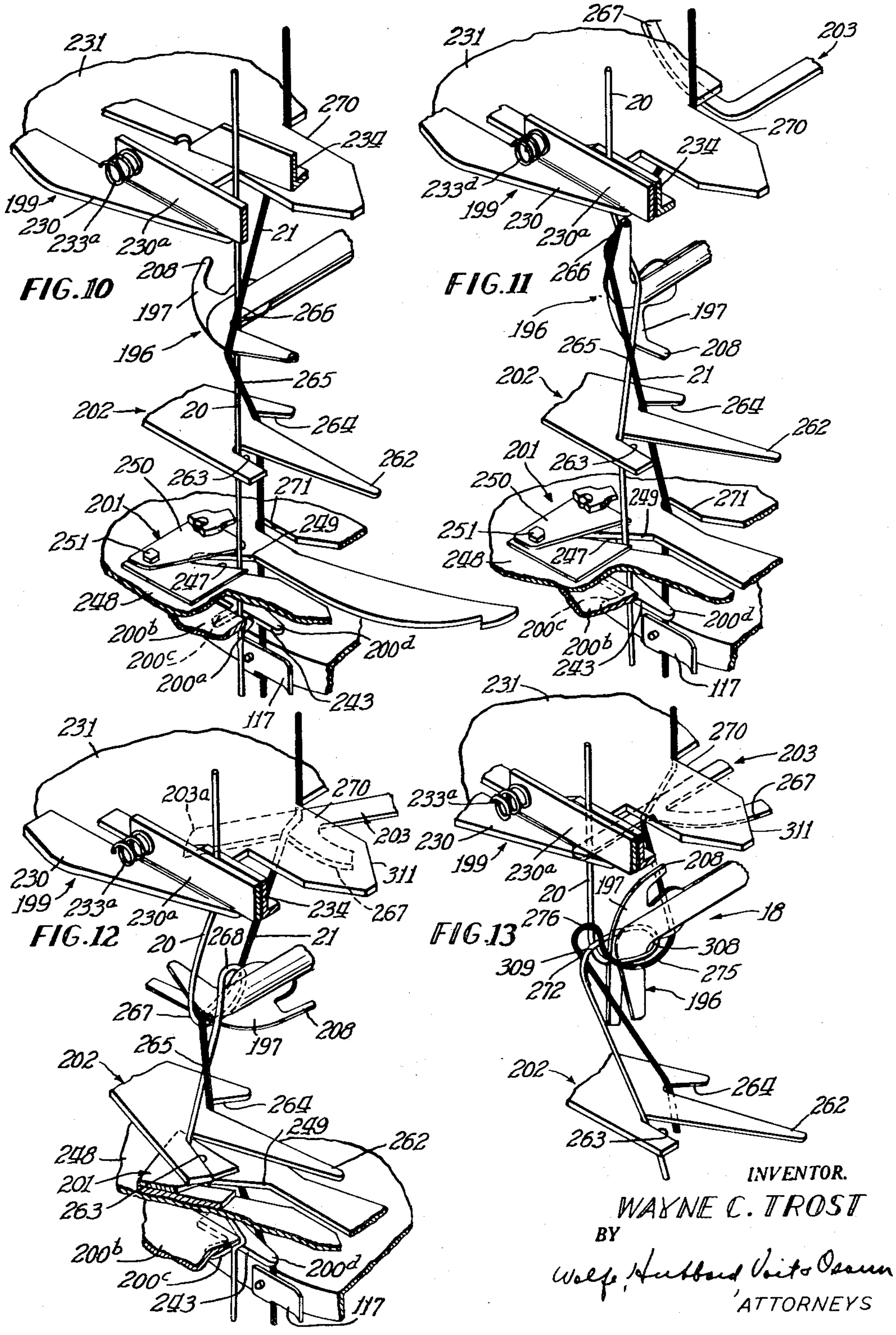
Figure 14:
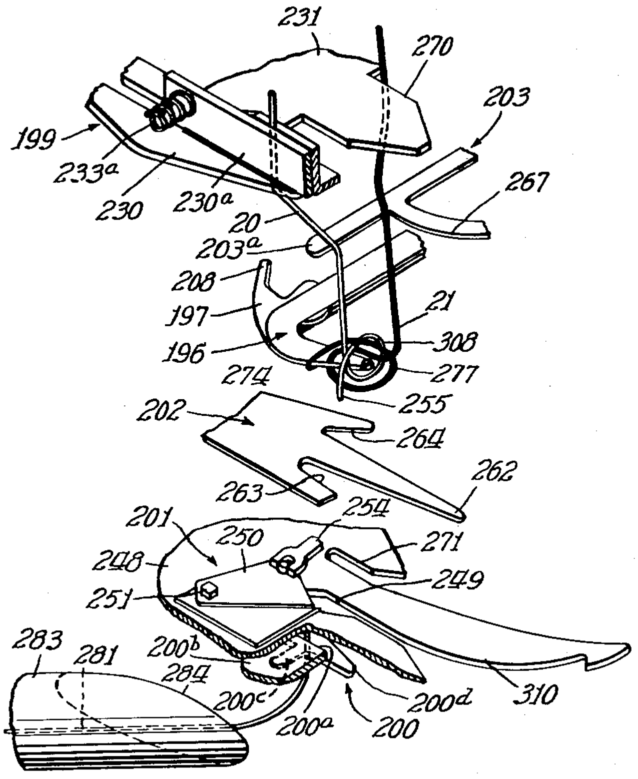

The bill 196 comprises the short tapered legs 196$^a$ and 196$^b$ of two L-shaped parts (FIG. 5) whose long legs are joined by a band-like clip 207 and project rigidly from the outer end of a shaft 204 thus forming an extension of the shaft. The latter is journaled intermediate its ends (see FIG. 1) in a bearing mounted on an extension 205 of a bracket 28 of the knotter frame. The bill 196 and the shaft 204 are disposed at somewhat less than a right angle relative to each other and intersect at a heel 196$^d$ which is well rounded around its full periphery. The opposed flat sides of the bill parts provide a guideway in which the flat shearing bill 197 is disposed and swings about a pivot pin 206 at the heel of the bill. The bill spring 196$^b$ and its shank are flat and bent at 196$^c$ so as to press the shearing blade 197 against the bill 196$^a$ and provide a scissor-like action in gripping and severing the reserve thread 21 (FIGS. 12 to 14).

Figure 15:
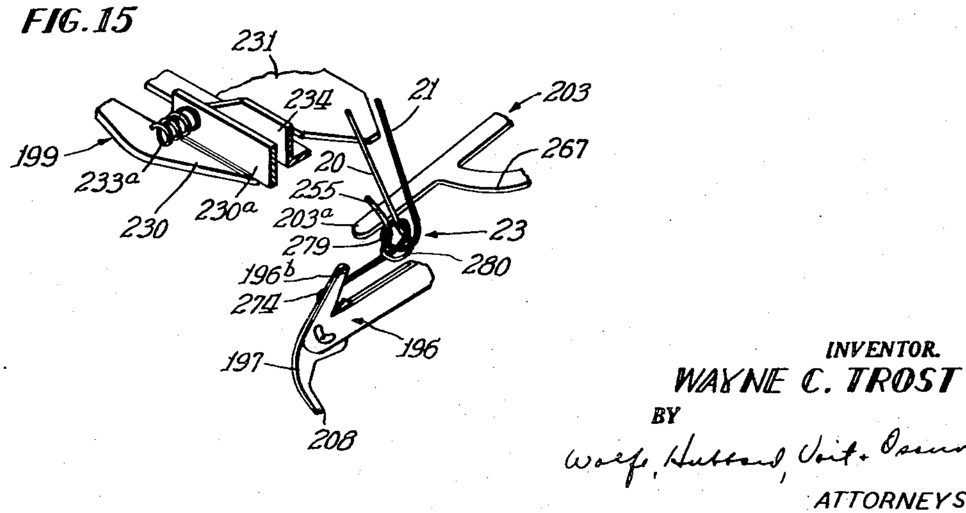

The shearing blade 197 is stamped from resilient sheet metal with a narrow tail 208 disposed on the other side of the shaft 204 and inclined backwardly relative to the shaft at an acute included angle somewhat less than that included between the shaft and the bill. An enlargement 209 integral with the heel of the blade extends along the shaft 204 and provides projecting follower lobes 210 which ride the internal heart-shaped surface 211 of a tubular cam 212 (FIG. 2) surrounding the shaft 204 and telescoping in a recess 213 formed eccentrically of the shaft. By adjusting the cam angularly in its mounting, the positions of the shaft at which the bills will be opened and closed may be varied to achieve proper timing in the operation of the knotter relative to the associated parts. The edge 197$^a$ of the shearing bill 197 is sharpened so as to coact with the corresponding edge of the bill 196$^b$ in cutting off of the reserve thread as the knot is being tied. The blade 197 also coacts with the bill 196$^a$ to clamp and hold the severed end 274 of the thread (FIG. 15).

*Load and fire actuator*

Turning the of the knotter bills to form the knot instantaneously is effected by energy stored in a torsion spring 215 (FIG. 7) which is released or fired when the thread 20 breaks and is reloaded in the ensuing indexing of a shaft 24 as fully described in the aforesaid application. Herein the spring 215 is a helix coiled about an upright shaft 216 journaled at opposite ends in bearings on the frame brackets 27 and 29. The upper end of the coil is fastened to the hub of a pinion 217 loose on the shaft 216 and meshing with a larger spur gear 218 pinned to the shaft 24 and holding the spring end fixed when the shaft is at rest. At its lower end, the spring coil is secured to the hub of the stripper 203 which is fixed to a bevel gear 219 pinned to the knotter shaft 216 and meshing with a beveled pinion 220 fast on the end of the shaft 204 opposite the knotter bills. Thus, when the shaft 216 is tripped from a normal set position, the energy stored in the spring is released thereby quickly turning the shaft 204 and the bill 196 through about four revolutions while the shaft 216 is turning through a little more than one revolution before the stored energy is dissipated.

*Firing the knotter*

While the running thread remains unbroken, the knotter shaft 216 and therefore the bills 196, 197 are latched in well defined positions in which the bills are disposed in proper relation to the running and reserve threads 20 and 21 for initiating the tying of the knot immediately upon release or firing of the knotter. Such holding of the shaft is effected in the present instance by a latch 221 (FIG. 6) whose laterally projecting lug 222 blocks the tip of an arm 223 fast on the knotter shaft 216 just above the frame bracket 27. The latch is fulcrumed on a pin 224 on the bracket 27 and its tip normally projects into engagement with a shoulder 225 on a detent 226 pivoted at 227 and urged toward the latch finger by a spring 228.

When a shaft 150 controlled by a thread break detector (not shown) is in normal rest position (FIG. 6), a notch 229 thereon is presented to the tip of the detent 226 allowing the latter to move inwardly far enough for the shoulder 225 to block the latch 221. Then, when the shaft 150 turns through about a quarter revolution, a cam formed by the bottom of the notch 229 moves the detent 226 away from the tip of the latch 221 thus releasing the latter for swinging clockwise (FIG. 6) under the torque exerted by the knotter spring 215 and against a stop 291. The lug 222 is thus carried out of the way of the arm 223 freeing the latter for rapid rotation until the energy stored in the actuator spring 215 is dissipated, this being in a little more than a revolution of the knotter shaft 216.

When the knotter shaft is latched in normal rest position (FIG. 6), the knotter bills 196, 197 are substantially closed and disposed horizontally (FIGS. 1 to 4). Upon firing of the knotter, the bills swing upwardly and then continue for about four revolutions counterclockwise (FIG. 4) and through the successive positions shown in FIGS. 10 to 15. Since the knot is tied and stripped from the bills in the first revolution, the bills turn idly in the succeeding revolutions.

*Thread clamps and actuation thereof*

Figures 4, 5:
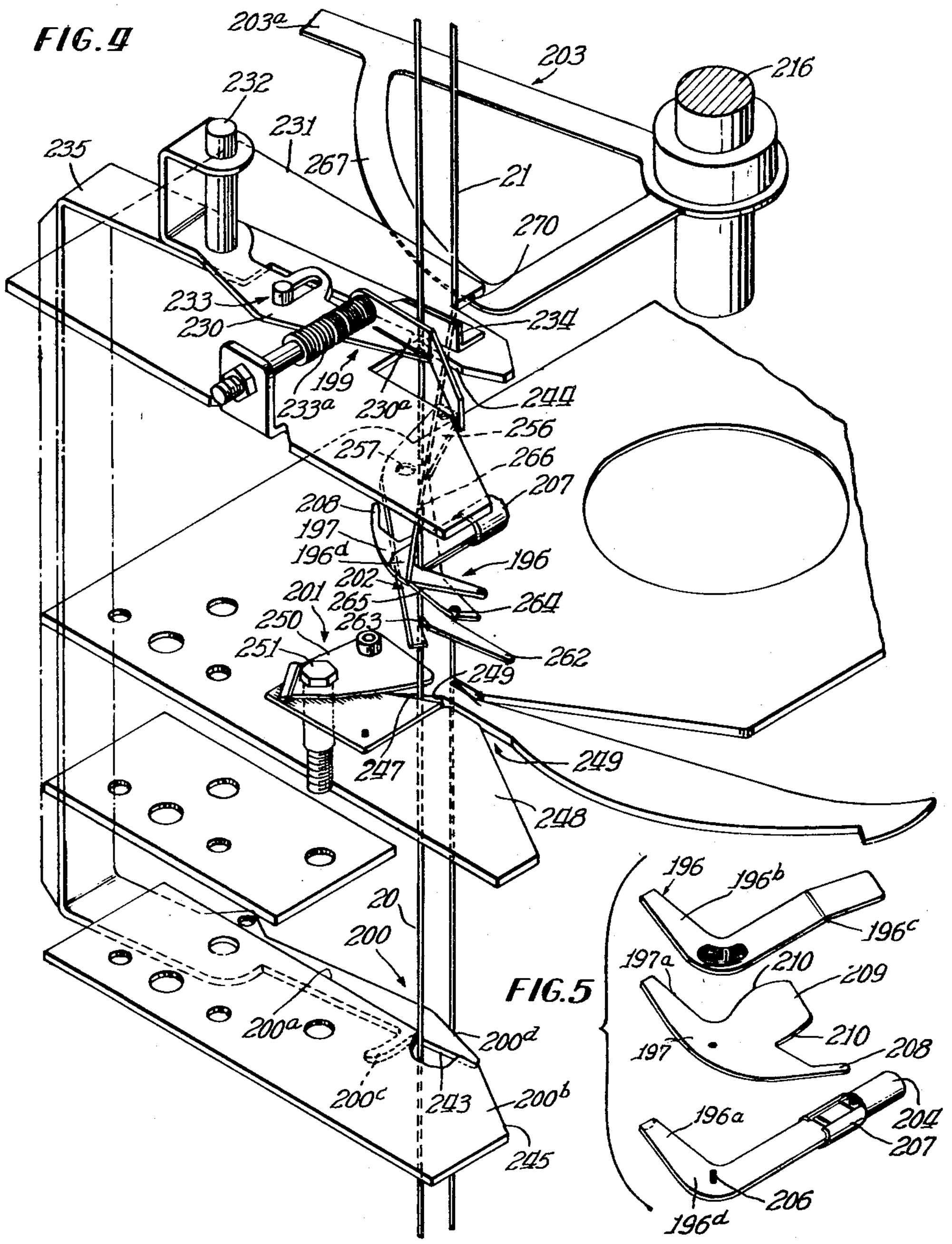
FIG. 4 is a fragmentary exploded perspective view of the knotter parts.
FIG. 5 is a perspective view of the knotter bills.

To permit of the desired instantaneous tying of the knot 23, the two threads 20, 21 are held in well defined positions for proper engagement with the bill 196 as soon as the knotter is fired. Thus, as shown in FIGS. 1 and 4, the thread 20 is disposed within the heel of the bill and runs along a straight path defined by surfaces of the upper and lower clamps 199 and 200 above referred to, a throat 249 in the shear 201 and a notch 263 in the thread positioning finger 202.

While the thread 20 is running past the knotter bill, the reserve thread 21 is held taut and positioned alongside and in front of the running thread while crossing the latter at the point 265 (FIG. 1) below the bill 196 and then extending outwardly and around the heel of the bill. Above the latter, the thread 21 extends reversely crossing the path of the thread 20 at the point 266 and passing around an edge 231ᵃ of an upper guide plate 231. The lower end portion of the thread is held in upright position parallel to the running thread by engagement in a notch 271 of the guide plate 248 and a notch 264 in the finger 262.

Immediately upon firing of the knotter, the running thread 20 is gripped by the lower clamp 200 a short distance below the knotter bills and then by the upper clamp 199 which is disposed above the bills. The intervening portion of the thread is thus held taut during the tying cycle. The upper clamp is of the yieldable pincher type so as to grip the thread firmly while permitting the same to slip downwardly therethrough as an additional length of the running thread is needed in the course of forming the loops of the knot. For this purpose, the clamp comprises a yieldable jaw 230ᵃ in the form of an upturned flange on a blade 230 resting on top of a plate 231 on top of the bracket 28 and fulcrumed on a pin 232. A yieldable backing in the form of a compression spring 233ᵃ normally urges the jaw to the right to a position (FIGS. 1 and 4) determined by the slack in a pin and slot connection 233.

A flange 234 forming the movable jaw of the clamp lies along the right edge of the guide notch in the plate 231 and is formed on one arm of a U-shaped yoke 235 also fulcrumed on the pin 232 to swing across the top of the plate. Such closing and opening of the clamp 199 to grip and release the thread occurs at 236 and 237 (chart FIG. 17) in the cycle of the knotter shaft 216 and is produced by a groove 238 (FIG. 9) on a cam disk 239 fast on this shaft. The cam follower is on one end of a lever 240 fulcrumed at 241 and coupled at its other forked end to a roller 242 on the yoke 235.

The lower clamp 200 is of the overlapping blade type comprising the edge 200ᵃ (FIGS. 1 and 4) of a horizontal plate 200ᵇ fixed to the bracket 28. Underlying this edge is a lug 200ᶜ projecting laterally from the edge of a blade 200ᵈ formed as an extension of the lower arm of the yoke 235. This clamp is thus closed on the thread at 236ᵃ (FIG. 17) prior to the gripping action of the upper clamp. It is opened at 237ᵃ by the cam 238 along with the upper clamp 199, the blade edge 243 moving past and beneath the fixed edge 200ᵃ to bend the thread around the coacting edges whereby to grip the same firmly while permitting some upward slipping if necessary during tying of the knot.

The openings defined between the jaws of the two clamps when open are alined vertically with a notch 244 in the stationary plate 231 (FIG. 4) by which the running thread is guided into operative position.

*Shear 201 for the running thread*

This device (see FIGS. 1, 4 and 10) which severs the running thread 20 immediately below the loop forming bill comprises a knife edge 247 on a blade fixed to a guide plate 248 and lying alongside the closed end portion of a throat 249. The edge 247 by which the thread is guided into active winding position, coacts with an overlying blade 250 fulcrumed at 251 and normally inclined away from the edge 247 to permit the running thread to enter between the edges of the shear. At 252 (chart FIG. 17), a cam groove 253 (FIG. 9) on the disk 239 rocks a lever 254 to the position shown in FIG. 14 thus engaging and shearing off the thread leaving only a short end 255 projecting below the knot.

*Positioning finger 202 and actuation thereof*

As shown in FIGS. 1, 4, 8 and 10, this finger 202 is disposed between the guide plates 231 and 248 and comprises the elongated end of a lever 256 fulcrumed at 257 on the bracket 28 to swing horizontally between the normal and actuated positions respectively shown in full and in phantom in FIG. 8. These back and forth motions occur in the course of the tying cycle and are produced by a groove 258 on the cam disk 259 fixed to the knotter shaft 216 immediately above the disk 239. A follower roller riding the groove is on one end of a lever 260 fulcrumed at 261 and forked at the opposite end to receive a roller on the short arm of the lever 256.

The sharpened free end 262 of the finger 202 guides the running thread into the bottom of a notch 263 alined vertically (see FIG. 4) with the V defined by the knotter bills and their supporting shaft. In a similar way, the leading end portion of the reserve thread 21 is guided along the other side of the tip 262 of a projection 202 into the rounded bottom of a notch 264 which is spaced inwardly from the running thread so that the reserve thread 21, when seated in the notch 264 and extended upwardly and around the outer side of the knotter bills, will lie adjacent and cross the running thread at 265 and 266.

*Knot stripper (FIGS. 1, 4, 14 and 15)*

After the knot has been completely formed, the running thread has been cut off, and the excess of the reserve thread 21 is being cut off by the knotter bills 196ᵇ, 197, provision is made for stripping the knot off from the bills and freeing the adjacent loop from the upper guides and clamp. This is accomplished by a finger 203ᵃ on the stripper 203 projecting outwardly from the trailing edge of a segment 267 whose hub is fast on the knotter shaft 216 immediately below the upper guide plate 231 (FIG. 1). As the knotter shaft 216 turns counterclockwise from the normal rest position shown in FIG. 4, the segment swings with the shaft and at the proper point in the tying cycle, the outer edge of the segment cams the reserve thread laterally into the path of the tail 208 (FIG. 13). Shortly thereafter as indicated at 278 (FIG. 17), the tip 203ª of the stripper engages both the running and reserve threads 20 and 21 above the bills and moves these threads and the partially formed knot 23 carrying them outwardly and away from the upper clamp 199 and guide plate 231 as shown in FIG. 15.

*Operation of knotter (FIGS. 4 and 10 to 17)*

During normal running of the thread 20, the thread extends transversely of the shaft 204 and in a straight vertical line between the lower and upper stationary guides 248 and 231 and is disposed as shown in FIGS. 1 and 4 between the jaws of the lower clamp 200, near the bottom of the guide notch 249, in the bottom of the notch 263 of the positioning finger 202, inside the heels of the knotter bills 196 and 197, and between the jaws of the upper clamp 199. At the same time, the leading end of the reserve thread 21 is disposed close to and in front of the running thread, being stretched lightly as disclosed in the aforesaid application. It extends downwardly through a notch 270 in the upper guide plate 231 and adjacent the stripper segment 267 and then bends laterally across and adjacent the running thread at 266 and around the outer side of the knotter bills adjacent the heels thereof. Then this thread is bent reversely beneath the bills and recrosses the running thread at 265 as it is led into the bottom of the notch 264 in the positioning finger 202. From the latter, the thread extends vertically down through the bottom of a guide notch 271 in the plate 248. By bending the reserve thread to form the crosses 265 and 266, the running thread 20 may travel through the knotter in the desired straight line and out of actual contact with the bill 196.

Upon firing of the knotter as described above, the shaft 216 turns counterclockwise as viewed in FIG. 4 through a little more than one revolution as determined by the stressing of the spring 215. During this revolution, the knotter bills turn through four revolutions and operate to tie the knot 23 in their first revolution as illustrated in FIGS. 10 to 15. Early in the first revolution, the movable jaws 200ᵈ and 234 of the clamps 200 and 199 are actuated as indicated at 236ª and 236 (FIG. 17) to grip the lower portion against the jaw 230ª (FIG. 11), so as to leave the intervening portion of the thread taut but free to slip through the clamps during formation of the knot. This movement of the jaw 234 shifts the thread to the left to a well defined position for properly locating the thread crossing 266.

As the bills swing upwardly from the horizontal rest position, the tips enter the V in the threads above the cross 266 and then spread the V and intervening portions of the threads somewhat apart as the first quarter revolution is completed as shown in FIG. 11. At this time, the tip of the tail 208 will be disposed to the right of the lower cross 265. As the turning continues, the bill tips pass over the cross 266 and into the V above thus drawing the cross downwardly to form a loop 267 in the thread 20 as permitted by slipping of the thread through the clamps.

In completing the first half revolution (FIG. 12), the tail 208 passes to the right of the lower cross 265 and cams the latter to the left as the cross slides inwardly along the outer edge of the tail. At this time, the portion of the thread 20 adjacent the loop 267 will be looped upwardly and over the heel of the bills on the inside of the heel as indicated at 268. The thread then extends downwardly ahead of the loop 267 and behind the reserve thread.

Early in the cycle as indicated at 307 (chart FIG. 17), the positioning finger 202 is shifted by its cam 258 to the left and to the position shown in FIG. 12. This shifts the lower part of the thread 20 to the left into the shear 201 and out of the path of the knotter bills. The adjacent portion of the reserve thread is thus positioned for entry between the bills 196 and 197 as the latter approach the three quarter revolution position (FIG. 13). Before reaching this position, the shearing bill 197 is swung outwardly as indicated at 269 (FIG. 17) by the cam 211.

In the third quarter revolution, the loops 267 and 268 are formed into a single loop 308 encircling the heel of the knotter bills and crossing at 309. The reserve thread extends downwardly behind the shank of the bills, then upwardly in front of the bill 196 over the thread 20 and finally across the latter at 272 and downwardly between this thread and the loop 308 therein. Thus, the reserve thread is shaped into two loops 275 and 276.

By this time, the outer edge of the stripper segment 267 will have engaged the reserve thread and cammed the same laterally beneath the plate 231 as shown in FIG. 13 and far enough to place the upper part of the thread in the path of the tip of the tail 208. In the continued turning of the bills, the curved outer edge of the tail cams the thread to the left from the position shown in FIG. 13 and outwardly around the heel of the knotter bills. As a result, the loops 275 and 276 are converted into a single closed loop 277 (FIG. 14).

During this same turning beyond the position shown in FIG. 13, the lower part of the thread 21 enters between the bills 196 and 197 which become closed at 273 (FIG. 17) to sever the thread but to grip and hold the end as indicated at 274 (FIG. 14) as the bills complete the first revolution. About this same time, the shear blade 250 is actuated by its cam 253 as indicated at 252 (FIG. 17) thus severing the thread 20 just below the loop 308. The cut off end remains held in the clamp 200 and its loose end is sucked away and disposed of in a manner to be described later.

In the fourth quarter revolution of the bills, and after the two loops 275, 276 of the thread 21 are combined into the closed loop 277, the latter becomes interlocked with the previously formed loop 308 in the thread 20. By this time, the tip 203ª of the stripper 203 will have passed beneath the upper clamp 199 and engaged both the reserve and running threads as shown in FIG. 14 thus starting to carry the threads forwardly and shift the loop 308 outwardly along the bills and past the held end 274 as the latter is drawn through the loop 308 and around and behind the thread 20 while the latter remains held by the clamp 199. In its continued advance, the stripper rolls the partially formed knot outwardly and off from the tips of the bills illustrated in FIG. 15. The end 274 remains held by the bills thus tightening the previously formed loops into the forms indicated at 279 and 280. While the reserve thread remains held by the bills, the loops 279 and 280 are contracted and tightened into the final knot as the stripper continues past the knot and out of engagement with the threads. The knot is thus formed and stripped off from the bills and carried beyond the tip of the latter far enough to tension the free end 274 and pull it out of the bills.

The end 281 (see FIG. 14) which is cut off from the thread 20 by the shear blade 250 in the knotter cycle and the end 282 which remains held by the clamp 117 after the reserve or new running thread has been severed by the knotter bills are sucked away through a stationary tube 283 connected to a suitable vacuum system. The mount 284 of the tube faces toward and is disposed adjacent the knotter and therefore in a position to receive the loose ends at the times of their cut off or release.

*Resetting of knotter actuator*

After completion of the tying cycle, the knotter shaft 216 is stopped in approximately the position it occupies when reset. Thus, under the influence of the spring 215, the shaft 216 continues to turn through somewhat more than a full revolution during which the spring is completely unwound, the turning continuing until the inertia of the parts has been absorbed by reverse winding up of the spring. By this time, the end of the arm 223 will have passed by the laterally yieldable end of a stop 294 (FIGS. 6 and 16). Under this reverse stress and after the arm 223 passes the end of a yieldable stop 294 (FIG. 16), the arm 223 is swung in a clockwise direction and comes to rest against the end of the stop.

Resetting of the load and fire mechanism is effected in the ensuing indexing of the shaft 24 as described fully in the aforesaid application. Generally stated, the resetting involves the release of the leaf spring detent 293 and swinging of the latch 221 away from the stop 291 (FIG. 16) and back past the shoulder 225, these being effected by the cam action of angularly spaced shoulders 296 on the downturned flange 296ª of a cam disk 297 fast on the main shaft 24. Each shoulder engages successively with the tips 298 and 299 on the short arms of bell cranks 300 and 301 swingable about a pivot 302 mounted on the frame bracket 27 adjacent the shaft 24. The long leg of the bell crank 300 projects outwardly and radially and has lugs 303 at its outer end straddling the leaf spring 293 near the free end thereof. A similarly projecting but shorter arm on the bell crank 301 is coupled through a pin and slot connection 304 to an arm 305 rigid with the latch 221 and projecting beyond the pivot 224 thereof. In the released position of the knotter latch 221, both of the bell crank tips 298 and 299 are disposed in a notch of the cam flange 296ª and thus are adapted for engagement by the next cam shoulder 296.

In the initial part of the indexing motion, a shoulder 296 picks up the tip 298 and rocks the bell crank 300 clockwise thus releasing the detent 293. Shortly thereafter, the same cam shoulder engages the tip 299 of the bell crank 301 and rocks the latter and the latch 221 counterclockwise to carry the tip of the latch back past the shoulder 225 to the position shown in phantom in FIG. 16. The lug 222 on the latch is thus returned to a position for blocking the tip of the knotter release arm 223 before a substantial rewinding of the spring 215 takes place. The arm does turn away from the end of the stop 294 before the latch lug 222 reaches its final position but is swung back immediately as the cam 296ª passes over the tip 299. Finally, when the cam rides off from this tip releasing the lever 301, the latch 221 will be swung clockwise under the action of the rewound spring 215, the tip of the latch coming against the shoulder 225 of the trip detent 226.

I claim as my invention:

1. The combination of, spaced clamps having yieldably engageable jaws, a rotary shaft, tapered knotter bills disposed side by side and projecting laterally from one side of said shaft between said clamps, one of said bills having a tail projecting from the opposite side of said shaft and curved toward the shaft, said clamps being adapted to grip and support a thread with the latter extending transversely of said shaft substantially in a straight line within and adjacent the heel defined by the junction of said shaft and said bills, means supporting a second thread alongside the first thread and crossing in front of the latter at points disposed between the bills and the respective clamps with the intervening part of the thread lying adjacent the outer side of said bills, means for turning said shaft through at least one revolution to first enter the tips of said bills between said threads outwardly and between one of said crossing points and the adjacent clamp, and loop the two threads around said heel as said tail passes the other crossing point, means for opening and closing said bills in the latter part of the revoltuion to receive, cut off, and hold said second thread, means engaging said threads beyond said second cross and operable to shift the same laterally and, after formation of the thread loops, position the second thread only for entry between the open bills, means operating during such positioning to cut off said first thread at a point adjacent said positioning means, and a member engageable with both of said threads beyond said first cross and operable to shift the interlocking loops outwardly along and off from said bills.

2. In a mechanism for uniting two threads, the combination of, a rotary shaft, tapered knotter bills disposed side by side and projecting laterally from said shaft, one of said bills having a tail projecting from the opposite side of said shaft and curved toward the shaft, clamps for yieldably engaging one of said threads at points spaced from opposite sides of said bills and holding such thread in a straight line within and adjacent the heel formed by the junction of said bills and said shaft, and with the thread extending transversely of said shaft, means for supporting said second thread along one side of the first thread and crosing the latter at points spaced from and on opposite sides of said bills with the intervening part of the thread lying adjacent the outer side of said bills, means for turning said shaft through at least one revolution to first enter the tips of said bills between said threads outwardly and between one of said crossing points and the adjacent clamp and loop the two threads around said heel as said tail passes the other crossing point, means for opening and closing said bills in the latter part of the revolution to receive, cut off, and hold said second thread, means engaging said threads beyond said second cross and operable to shift the same laterally and, after formation of said loops, position the second thread only for entry between the open bills, means for cutting off said first thread adjacent said positioning means after operation thereof, and means for shifting said loops along and off from said bills while said second thread is held by said bills.

3. In a mechanism for uniting two threads, the combination of, a rotary shaft, tapered knotter bills disposed side by side and projecting laterally from said shaft, clamps spaced from opposite sides of said bills and adapted for yieldably gripping one of said threads to support the same in a substantially straight line within and adjacent the heel formed at the junction of said shaft and said bills and with the thread extending transversely of said shaft, means for supporting the second thread along and adjacent one side of the first thread and crossing the latter at spaced points with the intervening part of the thread lying adjacent the outer side of said bills, means for turning said shaft through at least one revolution to first enter the tips of said bills between said threads outwardly and between one of said crossing points and the adjacent clamp and loop the two threads around said heel, means for opening and closing said bills in the latter part of the revolution to receive, cut off, and hold said second thread, means engaging said threads beyond said second crossing point and operable to shift the same laterally and, after formation of said loops, position the second thread only for entry between the open bills, means for cutting off said first thread adjacent said positioning means after operation thereof, and means for shifting said loops along and off from said bills while said second thread is held by said bills.

4. In a mechanism for uniting two threads, the combination of, a rotary shaft, a tapered knotter bill and an adjacent coacting shearing bill disposed side by side and projecting laterally from said shaft, first and second clamps for yieldably engaging one of said threads at spaced points and holding the same substantially in a straight line within and adjacent the heel formed at the junction of said shaft and said bills and with the thread extending transversely of said shaft, means for supporting the second thread along and in front of the first thread and crossing the latter at first and second points spaced along the first thread and on opposite sides of said bills with the intervening part of the thread lying adjacent the outer side of said bills, means for turning said shaft through at least one revolution to first enter the tip of said bills between said threads outwardly and between said first crossing point and the adjacent first clamp and loop the two threads around said heel, means operable during said revolution to open and close said bills to receive, cut off, and hold said second thread, means for cutting off said first thread adjacent said loops and guiding the adjacent part of said second thread only in between said bills when the latter are open, and subsequently operating means coacting with said bills to form and tighten said loops into a weaver's knot and shift the same off from said bills while the free end of said second thread is held by said bills.

5. In a mechanism for uniting two threads, the combination of, a rotary shaft, a tapered knotter bill and an adjacent coacting shearing bill disposed side by side and projecting laterally from said shaft, clamps spaced from opposite sides of said bills and adapted for yieldably gripping one of said threads to support the same substantially in a straight line within and adjacent the heel formed at the junction of said shaft and said bills and with the thread extending transversely of said shaft, means for supporting the second thread along and in front of the first thread and crossing the latter at points spaced along the latter and on opposite sides of said bills with the intervening part of the thread lying adjacent the outer side of said bills, means for turning said shaft through at least one revolution to first enter the tip of said bills between said threads outwardly and between one of said crossing points and the adjacent clamp and loop the two threads around said heel, means operable during said revolution to open and close said bills to receive, cut off, and hold said second thread, means for cutting off said first thread adjacent said loops and guiding the adjacent part of said second thread only in between said bills when the latter are open, and subsequently operating means coacting with said bills to form and tighten said loops into a weaver's knot and shift the same off from said bills while the free end of said second thread is held by said bills, said last mentioned means comprising a stripper engageable with both of said threads adjacent said loops and moving the latter outwardly along the bill and off from the tip thereof to strip the knot from the bills and pull said free end out of the latter.

6. A weaver's knotter as defined by claim 2 including means operable in timed relation to the turning of said knotter bills and engageable with said second thread to shift the latter laterally into the path of said tail before the latter comes into engagement with such thread.

7. A weaver's knotter as defined in claim 4 in which said first clamp comprises rigid and yieldable jaws having opposed surfaces moved into abutting engagement to clamp said first thread between them.

8. A weaver's knotter as defined in claim 4 in which said last mentioned means comprises a stripper arm rotatable in a plane paralleling said shaft and disposed between the shaft and said first clamp combined with means for turning said arm in timed relation to said shaft.

9. A weaver's knotter as defined in claim 8 in which said shaft turning means rotates said arm unidirectionally through one revolution from a normal rest position while turning said shaft through a plurality of revolutions.

References Cited in the file of this patent

UNITED STATES PATENTS

| | | |
|---|---|---|
| 1,611,890 | Coleman | Dec. 28, 1926 |
| 2,169,800 | Huffstickler | Aug. 15, 1939 |
| 2,262,035 | Noling | Nov. 11, 1941 |